UNITED STATES PATENT OFFICE.

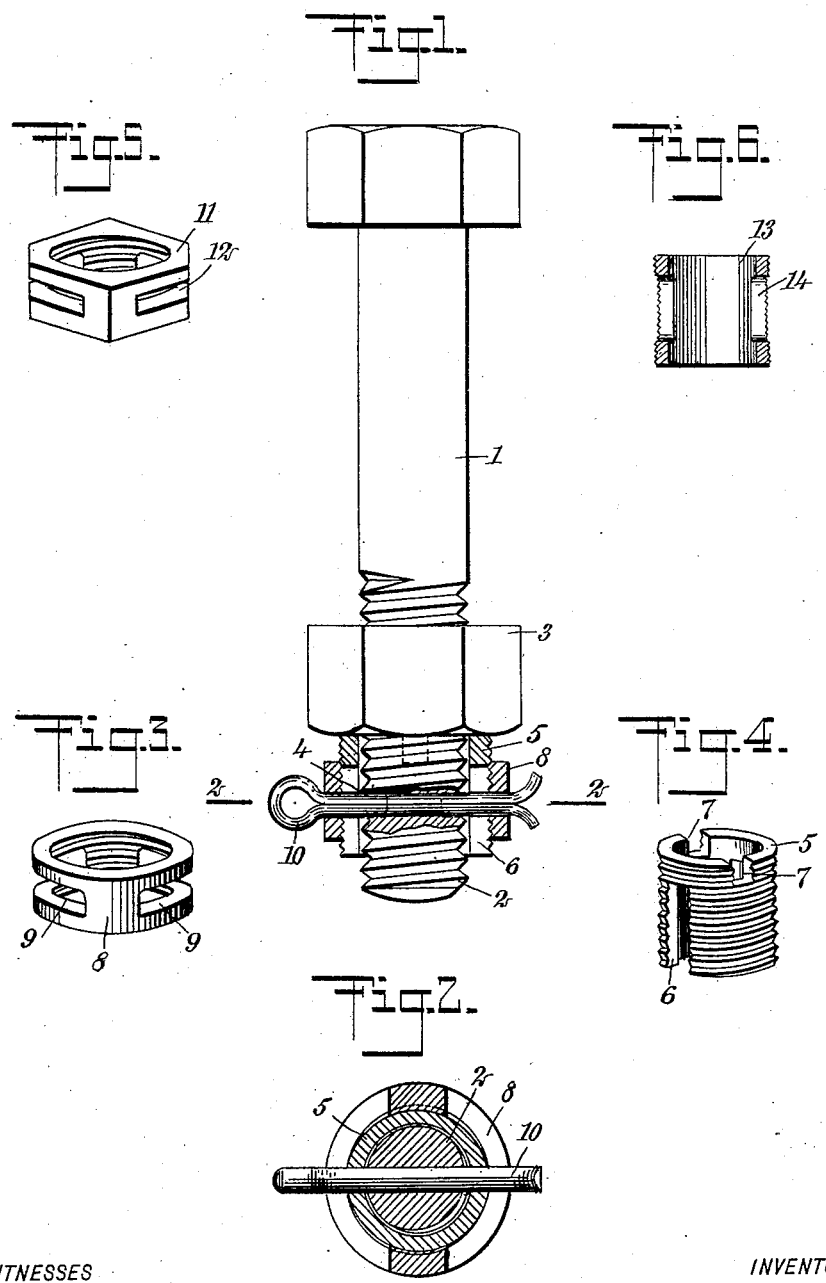

FREDERICK YOUNG, OF DENVER, COLORADO.

ADJUSTABLE NUT-LOCK.

No. 914,908.  Specification of Letters Patent.  Patented March 9, 1909.

Application filed November 9, 1908. Serial No. 461,644.

*To all whom it may concern:*

Be it known that I, FREDERICK YOUNG, a subject of the King of Great Britain, and a resident of Denver, in the county of Denver and State of Colorado, have invented a new and Improved Adjustable Nut-Lock, of which the following is a full, clear, and exact description.

This invention relates to adjustable nut locks, and more particularly to such as are constructed independently of the nuts themselves, and each of which in general consists of an externally threaded sleeve adapted to be slidably carried on the threaded end of a bolt, and having slots extending longitudinally thereof, an internally threaded ring adapted to be removably arranged on the sleeve and being provided with transversely extending key-ways, and means adapted to be passed through the key-ways of the ring, the slots of the sleeve, and an opening in the bolt whereby the ring and sleeve will be firmly secured in place, and will prevent the displacement of the nut against which the sleeve abuts.

The object of the invention is to provide a device of the class described, simple and efficient in construction and inexpensive to manufacture, which can be easily arranged on a bolt to hold a nut in place, and which is so constructed that, should it be necessary, it can be constantly adjusted as the objects that are held in place by the nut become loose through wear.

Reference is to be had to the accompanying drawings forming a part of this specification, in which similar characters of reference indicate corresponding parts in all the views.

Figure 1 is a side elevation having parts in section, and showing an embodiment of my invention applied to the threaded end of a bolt; Fig. 2 is a cross section on the line 2—2 of Fig. 1; Fig. 3 is a perspective view of the ring; Fig. 4 is a perspective view of the sleeve; Fig. 5 is a perspective view of a modified form of ring; and Fig. 6 is a longitudinal section of a modified form of sleeve.

In the specific form shown in the drawings, 1 represents a bolt having a threaded end 2, on which a correspondingly threaded nut 3 of any common or preferred form, is removably arranged. The threaded end of the bolt has an opening 4 extending therethrough. Adapted to be slidably and removably received by the end 2 of the bolt is an annular externally threaded sleeve 5, the latter being provided with a plurality of longitudinal slots 6 which, when the sleeve is in a certain position on the bolt, are adapted to register with the opening 4. The sleeve is further provided with several recesses 7 in its upper edge, these recesses serving to allow the sleeve to be held firmly in place by means of a suitable tool, as the device is being adjusted. I further provide an internally threaded ring 8 annular in form and adapted to be removably arranged on the sleeve 5. The ring is provided with key-ways 9 which extend partly around the same and which, when the ring is in position on the sleeve, will register both with the slots of the sleeve and the opening in the bolt. Adapted to be passed through these registering openings is a cotter pin 10 or the like, which serves to lock both the ring and the sleeve firmly in place on the bolt end.

In the modified form shown in Fig. 5, I have provided an internally threaded ring 11 presenting key-ways 12 and having its outer face hexagonally-shaped, so that it may be easily grasped by a tool, such as a wrench or the like.

In the other modification shown in Fig. 6, I have provided a sleeve 13 presenting longitudinal slots 14, the latter, however, extending only part way between the upper and lower end thereof, while in the preferred form shown in Fig. 4, the slots 6 extend from a short distance below the top through the bottom.

In the operation of the device, the sleeve is arranged on the bolt end so that its upper side will rest against the nut 3 to be locked in place. While in this position, it is held in place by means of a suitable tool, which engages the recesses 7, then the ring 8 is arranged thereon. When the ring has been properly adjusted, the pin 10 may be passed through the keyways, the slots of the sleeve, and the opening in the bolt end, thus locking the device firmly in place, the sleeve continuing to abut against the nut.

My device is of particular advantage, for, should the nut or the objects that it holds in place, become worn and it should be necessary to change the position of the nut on the bolt end, the sleeve can readily be adjusted so that it will continue to be in engagement with the nut, while there will be no necessity of boring a further opening through the bolt end to permit of this adjustment.

Having thus described my invention, I claim as new and desire to secure by Letters Patent:

1. A nut lock comprising a member adapted to be loosely carried by a bolt end, said member having openings extending therethrough, a further member adjustably arranged on said first member and being provided with openings, said members being adjustable so that their openings will register with an opening in said bolt end, and means adapted to be located in said openings for locking said members in place.

2. A nut lock comprising a sleeve adapted to be removably carried on the end of a bolt, said sleeve having openings therethrough adapted to register with an opening in said bolt end, a ring provided with openings and adapted to be arranged on said sleeve, and a member adapted to be passed through said registering openings to lock said ring and said sleeve in position said member being received by said openings of said ring.

3. A nut lock comprising an externally threaded sleeve adapted to be removably arranged on the end of a bolt, said sleeve having slots adapted to register with an opening in the bolt end, an internally threaded ring adapted to be removably carried by said sleeve and being provided with openings, and means adapted to be passed through the slots of the sleeve, the openings of the ring and the opening in the bolt end, whereby said sleeve and said ring are removably secured in place.

4. A nut lock comprising an externally threaded sleeve adapted to be removably arranged on the end of a bolt, said sleeve having slots extending longitudinally thereof and adapted to register with an opening in the bolt end, an internally threaded ring adapted to be removably carried by said sleeve and being provided with key-ways, extending part way around the same, and a key adapted to be passed through the slots of the sleeve, the key-ways of the ring and the opening in the bolt end, whereby said sleeve and said ring are removably secured in place.

In testimony whereof I have signed my name to this specification in the presence of two subscribing witnesses.

FREDERICK YOUNG.

Witnesses:
C. W. COWELL,
MATTIE RAY YOUNG.